INVENTORS
Wolfgang Händler &
Fritz Rudolf Güntsch
BY George H. Spencer
ATTORNEY

INVENTORS
Wolfgang Händler &
Fritz Rudolf Güntsch
BY George H. Spencer
ATTORNEY

INVENTORS
Wolfgang Händler &
Fritz Rudolf Güntsch
BY George H. Spencer
ATTORNEY

INVENTORS
Wolfgang Händler &
Fritz Rudolf Güntsch
BY George H. Spencer
ATTORNEY

May 17, 1966 W. HÄNDLER ETAL 3,252,146

COMPUTER

Filed Sept. 6, 1961 6 Sheets-Sheet 5

INVENTORS
Wolfgang Händler &
Fritz Rudolf Güntsch

BY George H. Spencer
ATTORNEY

INVENTORS
Wolfgang Händler &
Fritz Rudolf Güntsch
BY George H. Spencer
ATTORNEY

United States Patent Office 3,252,146

Patented May 17, 1966

3,252,146

COMPUTER

Wolfgang Händler, Geisslautern, and Fritz Rudolf Güntsch, Konstanz, Germany, assignors to Telefunken Patentverwertungs-G.m.b.H., Ulm (Danube), Germany Filed Sept. 6, 1961, Ser. No. 136,296
Claims priority, application Germany, Sept. 10, 1960, T 18,996
12 Claims. (Cl. 340—172.5)

This invention relates generally to electronic computers, and more particularly to a control device therefor.

In such computers, the program instructions, such as, for example, "multiply," are handled by the computer in a sequence of steps, e.g., assuming of values, additions, digit shifts, etc. For each program instruction it is necessary that the computer carry out individual or concurrent micro-operations caused by microcommands which correspond to a microprogram coordinated with the corresponding command. Thus, each time the computer is told to multiply, the same microprogram is used for accomplishing this function.

Control units for the control of such microprograms are known wherein a particular decoder becomes active in cooperation with a matrix, an operation register, and a command counter, for triggering the microcommands. Control units are also known wherein the sequence of the microcommands is controlled by a chain of binary elements wherein at least one element is induced to its active electrical state or excited state which differs from the other elements and which activates an active or effective output. Generally, a microcommand is issued by exciting one element of the chain, e.g., a flip-flop or magnetic core is set at "1." To carry out a microprogram, the sequence of element excitation must be controlled according to the control sequence which differs for each microprogram and which has a random sequence which may contain both forward transfers, backward transfers, and repeated loops. A chain of elements capable of performing this function will hereinafter be referred to as a "sequence chain" to distinguish it from known shifting chains wherein the state of excitement systematically migrates, especially from digit to digit. It is known to provide a sequence chain for each microprogram which provides a sequence of excitation of the individual elements connected to the command lines, due to the organization of its element connections as well as with the cooperation of other necessary means. However, the sequence or connection of the individual elements to the command lines is in the same order in every case.

It is also known to use chains of delay elements for the control of this operation in which a pulse introduced thereto excites the command lines successively connected between the delay elements, and even suppression of individual outputs as well as formation of transfer branches and loops is possible with the cooperation of coincidence gates. It is also possible to produce similar programs using the same delay chains. All of this may be accomplished by controlling the corresponding coincidence gate and influencing it in a different manner in every case by a master operation matrix.

In contrast to the prior art, it is a main object of this invention to provide a control unit for computers which is extremely flexible, is simple in design and economic in wiring, as well as being easily placed into practice.

Another object of the invention is to porvide a control unit for computers which may be used for controlling microprograms of the type mentioned above, and controlling even more complex problems, such as predetermining the sequence of control of microprograms.

A further object of this invention is to provide a computer which may be used for controlling priority of operation and which is coordinated for execution of processing data in a rank or time priority sequence.

Yet a further object of this invention is to provide a computer control for simultaneous operations wherein several units of one computer or several computers cooperate to process voluminous data quickly.

These objects and others ancillary thereto are accomplished according to preferred embodiments of the invention, wherein the device may be organized and constructed by means of switch plates, for example printed circuit cards. The active or effective outputs of the chain elements are made effective in at least one matrix and preferably in a switched sequence in one of a plurality of different matrices. Such a matrix may be provided with AND-gates for conditional operation and also possibly decoding, as well as OR-gates and including a functional or operational section controlling the different operations and especially micro-operations. Another operational section is also provided for controlling the sequence of excitation of the chain elements by means of connections which return to the chain itself.

In this manner a single chain of binary elements may send a series of commands to operating lines which may then be assigned to the chain elements as desired, for forming a microprogram for example, and taking into consideration conditions. If desired it may carry out simultaneous decoding operations in an arbitrary or random sequence and which may be coordinated with the chain elements in any manner desired. The conditions which determine whether or not a microcommand or microprogram is issued may be produced by the active outputs of further sequence chains via matrix AND-gates. There is also the possibility of providing that the above-mentioned switching sequence be controlled by a further sequence chain, particularly a matrix controlled sequence chain, whose active outputs become conjunctively effective in the matrices. The two sequence chains thus form what may be considered a matrix cube, which in the following description will be referred to by this term. It should be noted, however, that this is merely a term used to express the relationships and make them more understandable while the actual spacial arrangements of the circuit elements need not be in the form of a cube.

If the principles of the present invention are used, increasingly more complex control problems may be solved. This is possible by using a combination of matrices or matrix cubes which may be controlled by one or several sequence chains in such a way that the outputs of the matrix cube or matrix, respectively, become conjunctively effective in another matrix or matrix cube.

In any of the constructions possible with the present invention, at least some of the matrices connected with the active outputs of the chain elements may have a third functional section or operational component with outputs connected with the digits of a counter for counting repetitions. It is expedient that the operational component or section producing the return connections into the sequence chain have outputs both for exciting and for deenergizing the chain elements which are connected with said outputs through AND-gates whose second input is connected to the output of the repetition counter.

In order to control simultaneous operation, provision is made so that the operations which can be effected by the steps of a switching sequence may be successively coordinated with or switched through to different applying units, especially units to be coordinated for simultaneous operation. This is accomplished by at least one further sequence chain and also by means of matrix AND-gates. The coordination or switching through of the applying units may be effected by means of two sequence chains with a coordinated matrix cube in accordance with a double sequence selection. This is preferably accomplished in such a manner that a cyclically operating matrix controlled sequence chain successively assigns applying units of the same rank to the cube outputs while a second matrix controlled sequence chain assigns the units to the outputs according to classes of rank.

Additional objects and advantages of the present invention will become apparent upon consideration of the following description when taken in conjunction with the accompanying drawings in which.

A sequence chain of the above-mentioned type in which one out of a plurality of elements is excited may be referred to as a one out of $n$ or $$\binom{n}{1}\text{-chain}$$

However, in a control unit according to the present invention it is also possible to provide operation for some of a plurality of elements to be excited which may be considered an $r$ out of $n$ or $$\binom{n}{r}\text{-chain}$$

These elements then perform a decoding operation together with the generation of the sequence. However, this will be discussed only briefly below because the principle of decoding operations is already known. For ease in understanding and in describing the principles of the control unit the present description will be based on the one out of $n$ chain.

Figure 1:
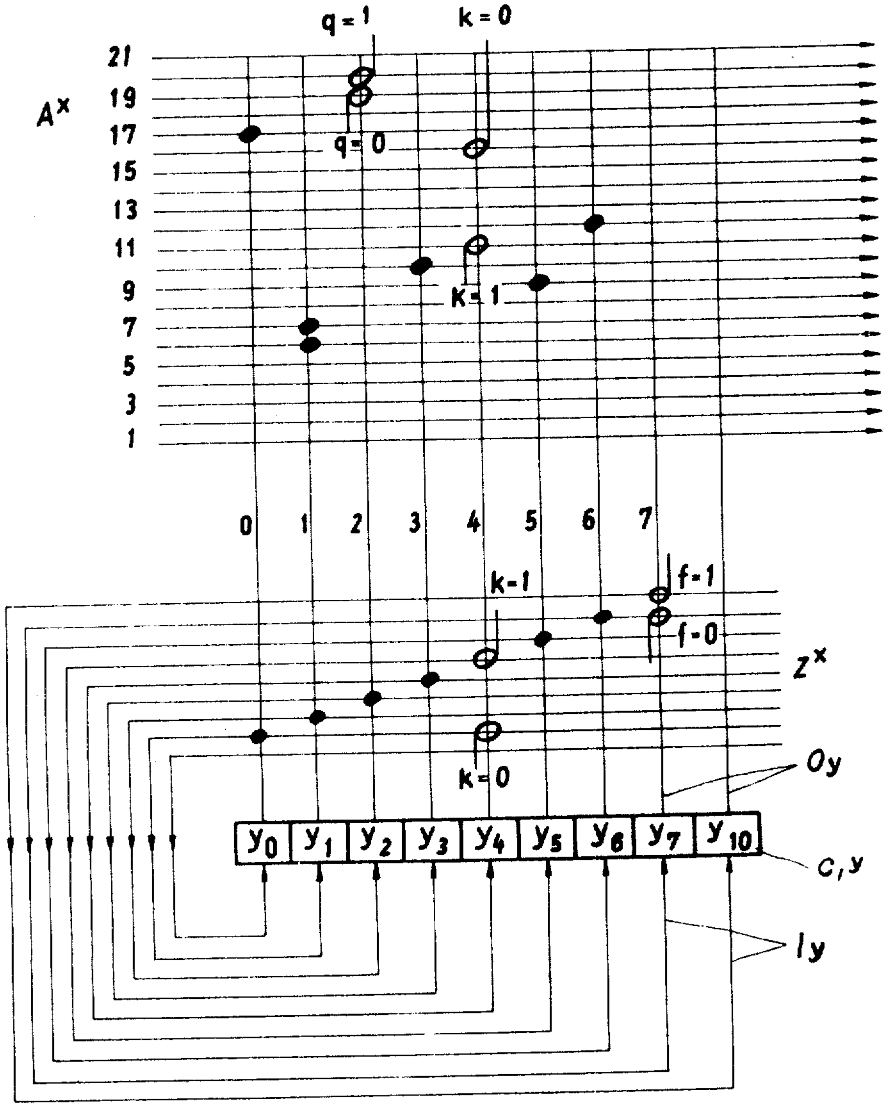
FIGURE 1 is a circuit diagram of the matrices comprising a sequence chain of a control unit.

With more particular reference to the drawings, FIGURE 1 illustrates a one out of $n$ chain which is formed of nine binary elements $y_0$–$y_7$, $y_{10}$, which form $C_1y$ which is a chain. The active or effective outputs $O_y$ are connected to an operational section $Z^x$ and an operational section $A^x$ which may be considered matrices, where these outputs are connected to AND-gates. Such AND-gates may be formed by a diode arrangement of AND-circuits as is known, or if desired by transistors and resistors.

Figure 3:
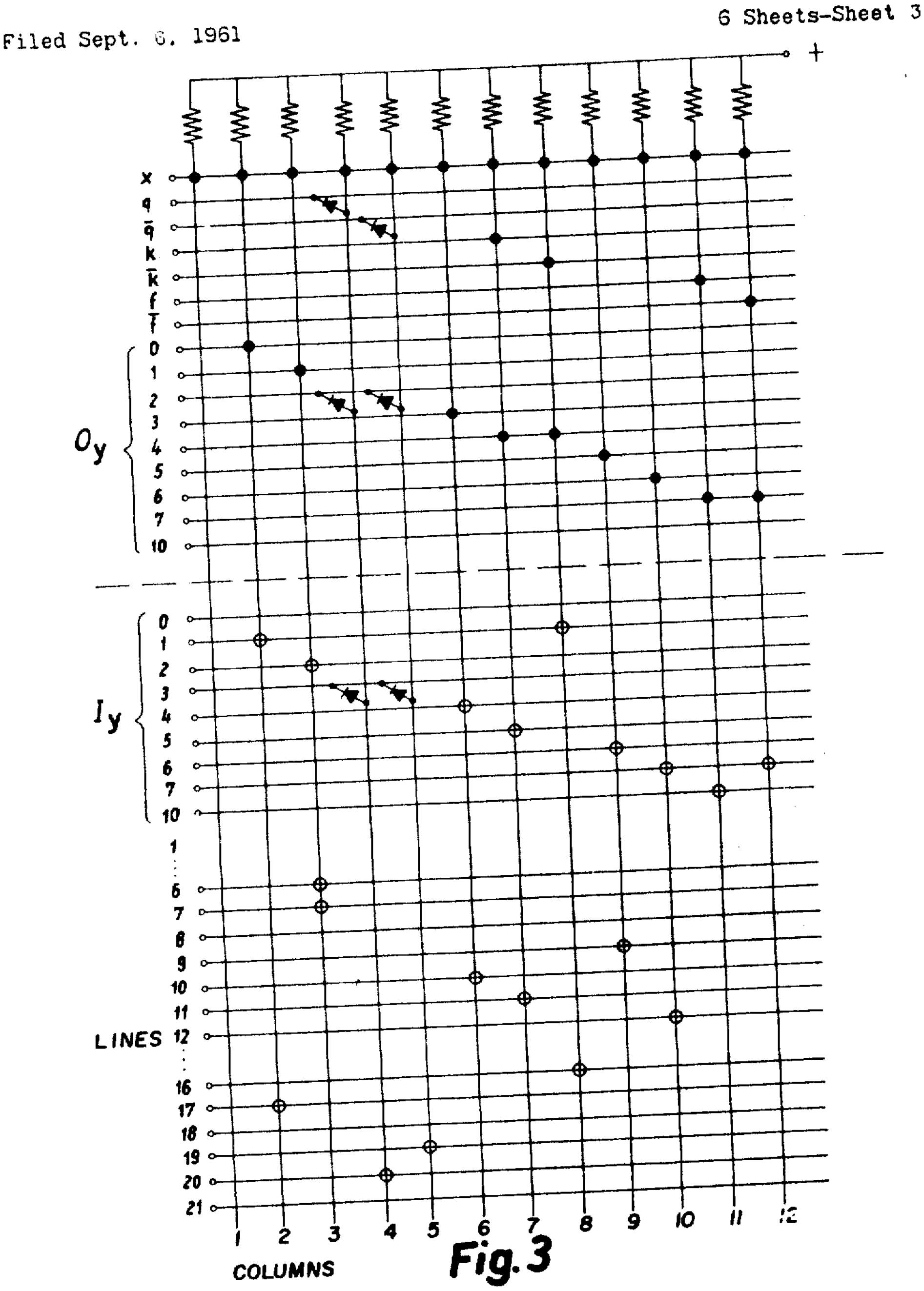
FIGURE 3 is a simplified circuit diagram of the matrices which would be used for the FIGURE 1 device.

The symbols provided at the crossing points do not represent soldered junctions but represent AND-gates. The solid circles symbolize simple AND-gates in a sense which will become evident below, while the open circles with the straight lead lines or stems attached, indicate that additional conditions, which are noted next to the straight lead lines, may be placed into the AND-gate as a further condition. In addition the other drawings except for FIGURE 3 are also based on this systematic notation and therefore do not represent the actual spacial arrangement.

The outputs of the lines 1 through 21 of the $A^x$ section of the matrix may be used for triggering micro-operations. Assume that in each case the second of the conditions for the simple AND-gates are met or provided. Then, if a signal is provided in the bottom line of matrix section $Z^x$ this signal proceeds into the input $Iy$ to element $y_0$. The active or effective output $Oy_0$ of this element proceeds to the AND-gates in the $A^x$ section along conductor 0 and from these AND-gates is transmitted to line 17 to then trigger the corresponding micro-operations. The AND-gate in the $Z^x$ section is connected to the second line from the bottom in this section which is in turn connected by a return path with the input $Iy_1$ of the next chain element $y_1$, and excites this second chain element. The output $Oy_1$ of the second chain element triggers the micro-operations connected with lines 6 and 7 by means of the AND-gates in the $A^x$ section. The AND-gate in the $Z^x$ section which is in the third line from the bottom leads to a return path and then to the input $Iy_2$ of chain element $y_2$ and this element is then excited.

The output $Oy_2$ of this element is connected in the $A^x$ section to two additionally connected AND-gates. Now, depending upon whether a magnitude, e.g., the lowest digit in a multiplier register, is 0 or 1, micro-operation 19 or micro-operation 20, respectively, is triggered. Also, the next chain element $y_3$ is rendered effective by means of the return path coordinated with the fourth line from the bottom in the $Z^x$ section. This chain element, in a manner which has been described above, triggers micro-operation 10 and causes excitation of chain element $y_4$. Now the active output $Oy_4$ of this element may effect two thinks by means of the additionally conditioned AND-gates in the $A^x$ section and the $Z^x$ section. If $k=0$ is now the condition which is present, then micro-operation 16 is triggered, and in the $Z^x$ section second line from the bottom via a backward transfer, the chain element $y_1$ is again excited and thus forms a loop wherein the elements $y_1$ through $y_4$ are again sequentially controlled. However, if $k=1$ the loop does not occur, and if it has already occurred when $k=1$ the loop does not continue. Under this condition chain element $y_4$ triggers micro-operation 11 as well as initiating the following chain element $y_5$. This, in turn, triggers micro-operation 9 and excites chain element $y_6$ which triggers micro-operation 12 and excites chain element $y_7$. At this point computer operation is delayed until the condition $f=1$, for example an all-clear or all-right signal, is provided. However, as long as $f=0$, the element $y_7$ remains excited by means of the feedback of $Oy_7$ to $Iy_7$.

It should now be clear that the sequence of chain $C_1y$ may be designed and conditioned as desired so that each chain element may determine the element which is to succeed it, and which is dependent upon conditions which may be reset by the AND-gates in the operational section $Z^x$. By means of the AND-gates in the operational sectional $A^x$ the micro-operations may be coordinated with conditions by connection with the active outputs $O_y$ of the chain elements, and this may be done in a very flexible manner. It is also possible to excite $r$ number of elements in the sequence chain according to a code. In this event the matrix will be arranged so that for each active output the simultaneous excitation of other outputs becomes effective as a condition for further switching of the sequence and the issuance of microcommands. Thus, a decoding operation is incorporated into the activity of the control unit.

The different microprograms which may in this manner be generated are thus enabled to proceed successively in accordance with program orders or commands which are to be carried out and for this purpose may be deposited in an operation register which has been mentioned above. For this purpose the active outputs of this sequence chain $C_1y$ are introduced into a plurality of the matrices of the type described by means of AND-gates in which they are to become effective in a switching sequence corresponding to the sequence of the main operations or the program command. This is accomplished by means of AND-gates which are peculiar to the matrix and to which the active outputs of the second sequence chain $C_2x$, including binary elements $X_n$, are led, which functions as an operation register. Thus, these active outputs introduce into the above-described matrices, the order or the main operation demanding the microprogram as condition which must be actually present.

Figure 2:
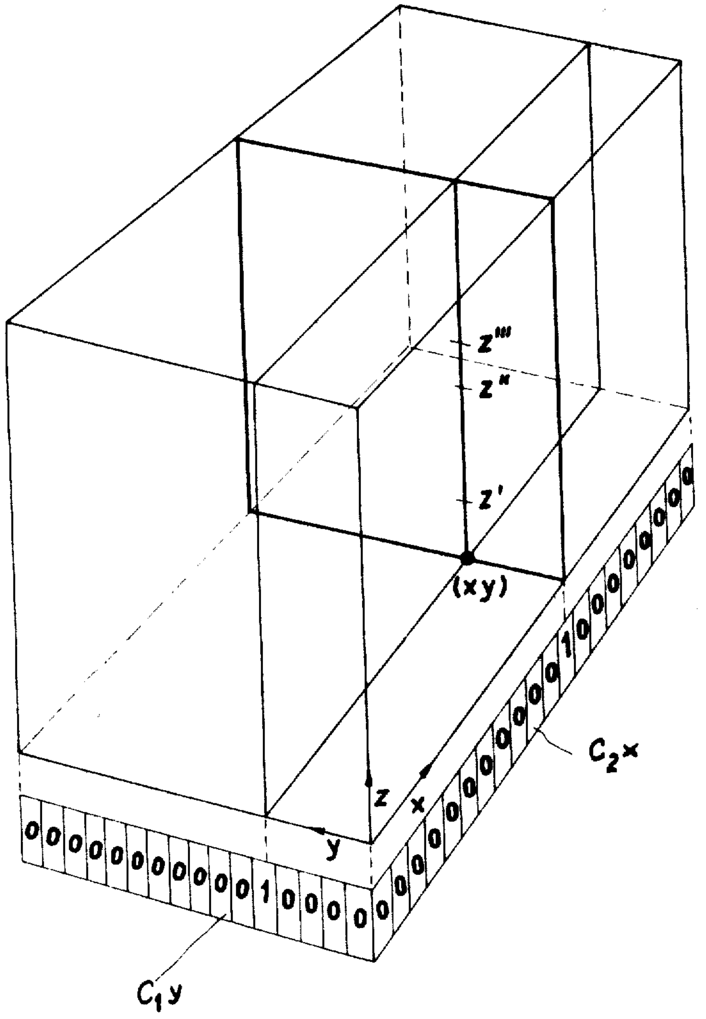
FIGURE 2 is a diagrammatic conceptual representation of two sequence chains connected to form a three dimensional coordinate grid system or a matrix cube.

Due to the type of representation chosen it may be con-dered that the two sequence chains $C_1y$ and $C_2x$ to-ether with the micro-operations to be triggereed in each ase, form a three dimensional cordinate grid system or matrix cube as illustrated in FIGURE 2. An AND-ate is present at a spacial grid point ($x$, $y$, $z$) if the co-rdinated micro-operation $z$ is to be triggered upon the xpiration of operation $x$ at a moment when the micro-ommand chain $C_1y$ indicates the state $y$. In each case ;, $y$, and $z$ are to assume only discrete values 0, 1, 2, etc. several different micro-operations $z'$, $z''$, $z'''$, etc. may be unctionally related to a pair $x$, $y$ and form a microcom-nand, such as the perpendicular in FIGURE 2.

An element which is excited, such as flip-flop $x$ of the operation register $C_2x$ which is set at condition 1, supplies the "one" potential to all of the AND-gates disposed in this particular $x$ plane. A flip-flop $y$ of the microcom-mand counter $C_1y$ which is also set at condition 1, sup-plies this "one" potential to all the AND-gates disposed in this $y$ plane. Thus, only along the line of intersection $x$, $y$, both the conditions are met, and the simple or basic AND-gates shown in FIGURE 1 as solid circles may be interpreted as being these AND-gates $x$, $y$. These AND-gates suply control signals $z'$, $z''$, $z'''$, etc., unless the out-put of such AND-gate is combined with a further condi-tion, e.g., in a further AND-gate, so that its output is active only if said further condition is met, dependent upon further conditions, as, for example, "but only if . . . ." With the use of this system of coordinates, a comparatively small number of the AND-gates may be rendered effective or responsive, which are those in the perpendicular of the drawing, while by far the greater number of the AND-gates of the cube remain ineffective. All of the control lines which are used for triggering the micro-operation $z$ and which therefore are disposed in plane $z$, are brought together again by means of OR-gates.

An actual method of wiring an embodiment of the invention will now be considered. In order to simplify the illustration, in FIGURE 3 only a few of the diodes disposed at the crossing points of the columns and rows are shown, and the diodes acting conjunctively as AND-gates are indicated with solid circles, while those acting disjunctively as OR-circuits are indicated by open cir-cles. The line coordinate system illustrated in FIGURE 3 is one method of placing the invention according to FIGURE 1 into practice. This line coordinate system may be provided on a switch plate which can be plugged in or on a printed card having marginal or peripheral connec-tions. The active or output lines of sequence chain $C_1y$ are connected to the terminals $Oy$ (0–7, 10) of nine rows, while the input or exciter lines of this sequence chain are connected to the terminals $I_y$ having corre-sponding numbers. The lines which receive the micro-commands are to be connected to the terminals 1 through 21. Further terminals, $x$, $q$, $\bar{q}$, $k$, $\bar{k}$, $f$, $\bar{f}$, are used for providing further conditions. The terminal $x$ is to be connected to the active output of the second sequence chain $C_2x$. The coordinate plane is separted into a con-junctive upper part and a disjunctive lower part which are in the drawing designated as being separated by the dashed line.

For example, assume that the terminal $Oy_4$ is in the electrical state having a potential which designates a "one." In this event, a "one" potential will be provided in colum 7 if a "one" potential appears at the terminals $x$ and $k$. This "one" potential in column 7 appears in the disjunctive section at the output terminals of lines 11 and $Iy_5$. On the other hand, the "one" potential at terminal $Oy_4$ will generate a "one" potential in column 8 if a "one" potential is disposed at terminals $x$ and $\bar{k}$ at the same time, which indicates that $k=0$. In this event, the signal will appear at the terminals of lines 16 and $Iy_1$. The line corresponding to terminal $Iy_1$ must also be able to receive a "one" signal by means of a diode which connects this line with the second column. Generally the lines of the bottom section must be capable of being excited by means of individual diodes which are con-nected with these lines. This is the above-mentioned disjunctive connection. The line diodes of the lower matrix section are therefore provided in a disjunctive or OR-circuit. The further operation of this circuit will readily be found by comparing same with the circuit diagram of FIGURE 1.

Figure 4:
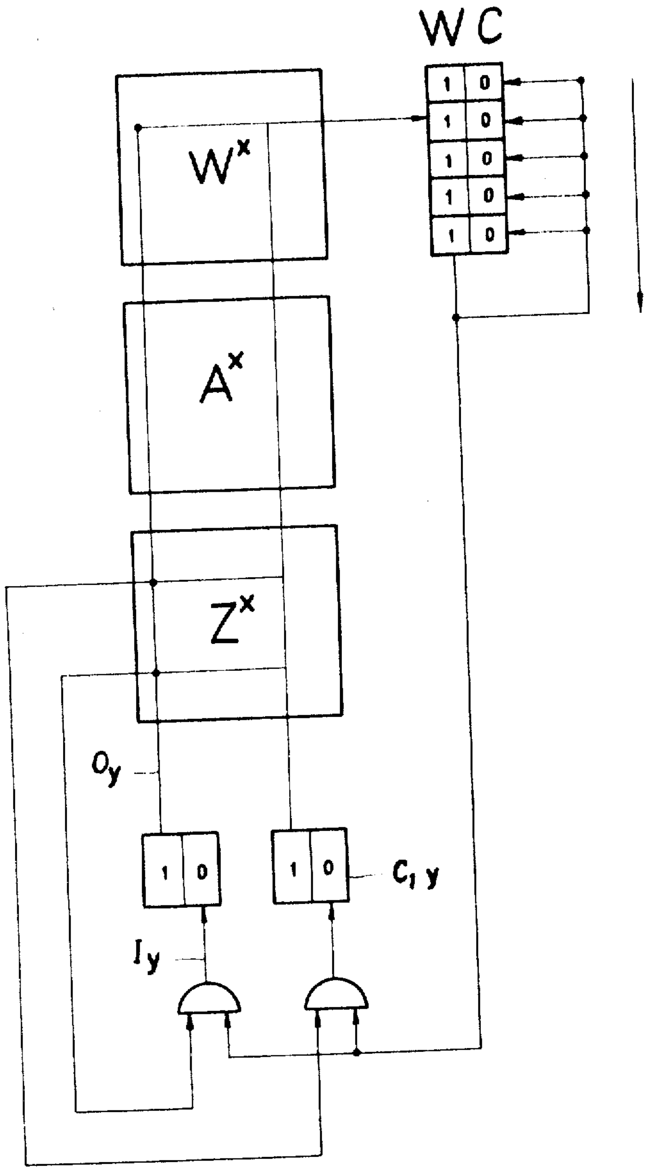
FIGURE 4 is a block diagram of a matrix arrangement including a further operational section which determines the number of repetitions to which each individual microcommand will be subjected.

With more particular reference now to FIGURE 4, it may be seen that a matrix is provided which has a further operational section $W^x$ for determining the number of repetitions to which each individual microcommand will be subjected. In order to accomplish this, the individual lines of this matrix are connected with the individual digits of a counter WC. The sequence chain is constructed of set-reset flip-flops with special lines being provided in the matrix $Z^x$ for the resetting operation.

Assume that the column flip-flop connected to column $Oy_n$ is at condition "one." First, the outputs of $A^x$ con-nected to this column will be activated. One of the lines is coupled to the matrix $W^x$. This line sets the correspond-ing flip-flop of the repetition counter WC at "one." The repetition counter will, in an uninterrupted manner, re-ceive feed pulses which assure that this condition "one" moves to the end of a counter, that is, downward in the drawing, over a period of time. Depending upon the arrangement used, a further sequence of conditions "one" may be written in after the first sets, or a differentiating element may assure that only during the first actuation of a line of matrix $W^x$ is a condition "one" recorded, so that this condition is recorded only once in the counter.

When the "one" arrives at the end or bottom of the counter, AND-gates which are connected to all of the inputs $Iy_n$ of the sequence chain are conditioned so that voltages or signals arriving from matrix $Z^x$ are trans-ferred from the column to the flip-flop, as shown in FIGURE 4. At the same time in the event that not only one of these "ones" but a whole series of them have been written into counter WC, then all of the digits of WC are set at zero. Although the AND-gates that have been mentioned are shown separately in FIGURE 4, they may, of course, be incorporated into the sequence matrix.

The counter WC may be designed as a presettable counter instead of as a shift chain, into which a binary coded number may be fed by means of matrix section $W^x$. In this event, the counter counts upwardly or downwardly by means of counting pulses up to a limit, preferably zero, where it transmits a final pulse. The return paths from matrix $Z^x$ through the sequence chain must be connected and arranged so that a line from $Z^x$ feeds an input of a flip-flop of a succeeding column and another line is brought into the zero input of the flip-flop which belongs to its own column. In this manner, counter WC switches in a new column when it attains its final position while the column which was active during the "word time" is switched off.

As has been mentioned above, a control unit according to the present invention may also be used for controlling simultaneous operation in which several computers are combined into a computing system, or several operating units of a single computer are to be combined for simul-taneous operation. When a combination of several com-puters into a system is used, the individual computers are coupled to each other in such a manner that they may be used jointly for solving a problem. The coupling is such that the computers are able to request and assume infor-mation pairwise from one another as well as to supply information to one another upon command.

The conditions in the event that computers with several simultaneously operating individual units are used are the same as in the above case. An effort is made to maintain all units in continuous operation as far as possible for the most efficient and rapid processing. In this connection it is to be noted that with analog computers parts are continuously active at the same time. For many reasons, at least some of which will be fairly obvious, an effort is now being made to use individual parts of digital computers in a similar manner, for efficiency of operation and the like.

Devices for simultaneous operation are timely for the following reasons:

(a) Modern conventional circuit elements in the digital computing art are used in circuits wherein their useful life does not depend upon the switching frequency but on their natural aging. Efforts are therefore made to use these circuit elements during their useful life with as high a number of switching operations as possible.

(b) There are a series of problems which require a computing performance which is not attained by computers of conventional structure even with the use of the most modern circuit elements.

(c) If several computers or computing units of the same kind are combined into a system, the entire system may continue operating, even in the case of failure of one part, if care is taken that another part takes over the functions of the disturbed part.

(d) In many cases it is not possible to concentrate the communication processing at one location because the information obtained at geographically widely distributed points must first be pre-processed on the spot so as to save and not overburden transmission facilities.

Computing performances better than those of computers of conventional structure are required, for example, in so-called real-time problems. In such problems, the computing must keep step with a process to be controlled or to be observed in the vicinity of the computer. Typical examples are reactor control, air control, telephone exchange service, and weather forecasting.

In another group of problems there is no strict deadline formation in the sense of the real-time problems, but they are so copious that they cannot be solved within a reasonable period of time. Thus, in partial differential equations—such as they occur, for example, in gas dynamics, in reactor building, and in the physics of solid bodies—the solution may require $10^7$ to $10^{11}$ multiplications. Further large scale problems, for instance planning problems, are posed by modern operations research.

In systems using simultaneous operation the following points have to be taken into consideration:

(a) Care must be taken to assure a logical distribution of the total operation to the individual computers or computing parts of the system.

(b) All parts of the system should communicate with one another, free of contradiction and according to a definite priority.

One problem occurring herein is to control the common demand made upon elements—predominantly of transmisson channels, buffers, and the like—by different units, and to do so free of contradiction. In this case, an encasement of the magnitude of a few cycle intervals is involved. Known programming art measures are then insufficient because the duration of the processes which are to be controlled usually are far below the operational duration of a command. For one thing, the conventional program technology, in general, provides no possibility of interrupting a computer operation during the execution of a command. For another thing, the demand for quick processing is so high that measures of program technology would not become effective in time, because otherwise an interruption of the command would not be initiated. Therefore, simple devices must be provided which must be classed with operation control according to their kind.

The difference between large scale distribution and small scale distribution may be illustrated by the example of the magnetic tape. If a program or a unit demands data from a magnetic tape, for example, in block form, this demand must agree with the requirements of other programs or other units. Assuming that the program or unit in question is not retarded by another one of a higher priority, the magnetic tape may be started. In this case large scale distribution is involved, which may be controlled by means of program technology. After the magnetic tape is running, it offers information, i.e., a sign or a word, in regular time intervals (regular up to a certain degree,) until the entire block has been read in. The individual information must pass through via the frequently used information channel, in a time period usually lying below the operational duration of the commands. Thus, these individual transports are expediently classed with small scale distribution and are accordingly accomplished by elements of operation control.

In several units corresponding with one another for simultaneous operation, there are some which make applications with other units, and these applications are to be processed by the last-mentioned units at a suitable moment. In other units there is the reverse case that applications of other units must be accepted for processing. There are also units which both make applications and receive them.

The situation will now be considered wherein the control unit acting as an applicant is encountered. As mentioned above, any transfers whatsoever are possible in the one out of $n$ chain for value $y$ and, therefore, there is no physical necessity for putting successive key numbers in the $y$ chain adjacent to each other. In this manner, it is thus possible to distinguish two groups of $y$ values.

The microcommands of the first group of $y$ values contain operations which are connected with an interference in the course of operation of other units, while all other microcommands are classed with the second group of $y$ values. The $y$ values belonging to the first group will be referred to as "essential."

The essential microcommands are called $y_{m(ab)}$ and are counted with $b=1, 2, 3$, etc. jointly for all operating units of a system. For each value $b$, value $m$ in $y_{m(ab)}$ designates the unit $m$ which equals 1, 2, 3, etc. where an application is to be made while $a$ indicates the priority class to which this application is assigned in the unit $m$. It may be seen that the essential values $y$ occur as an "average" for the commonly involved control units. These elements of the control units thus correspond to the "average elements" which are provided for transmitting information between the two communicating units, e.g. jointly used register elements on the borderline of two communicating storage units.

When considered from the viewpoint of the applying unit the process of application involves the "one" condition of the $y$ chain of the applying unit or applicant arriving at an essential microcommand $y_{m(ab)}$. The application signal is then transmitted to the processing unit $m$ by means of an element which assures that the application is performed during the cycle of unit $m$.

Figure 5:
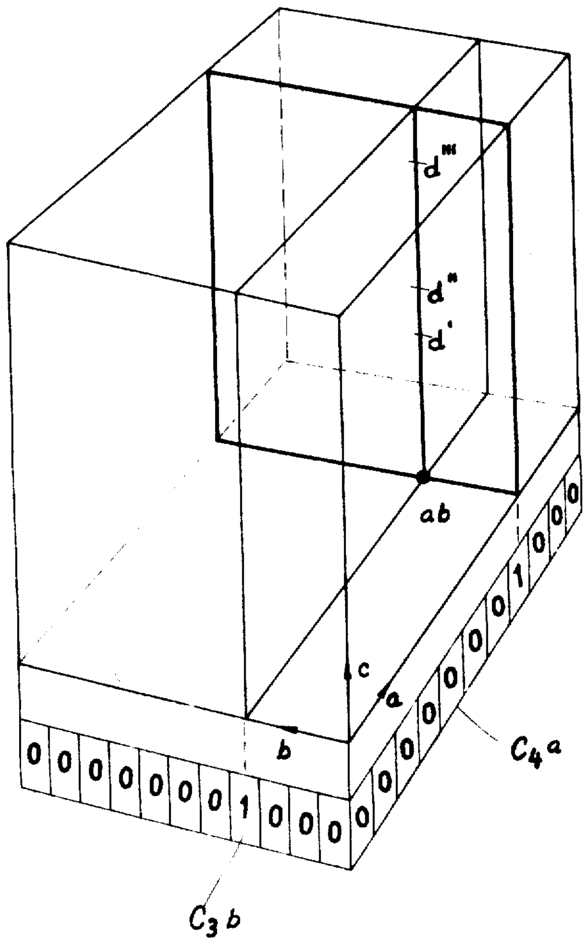
FIGURE 5 is a view similar to FIGURE 2 but illustrating the control unit set up for priority type operation.

Now, the conditions in unit $m$ which are required shall be considered. For this purpose, a control unit section is constructed as an addition to the above-described control unit for a simple computer operation, which section is described by a system of coordinates illustrated in FIGURE 5. The numbers of the various applications $y_{m(ab)}$ which may be obtained from different units correspond to the individual values $b$ of a sequence chain $C_3b$. The values $a$ of a further sequence chain $C_4a$ characterize the different classes of priority within the operation control considered, while $b$ characterizes the different operations demanded and which corresponds to the value $x$ of the individual microprogram units. Values $b$ and $a$ are input values in the cube formed by these two chains and which correspond to $x$ and $y$ of the simple control unit. Value $d$ results as the output, corresponding to $z$ in a simple control unit, and is used as an input for the simple control unit belonging to the ame unit. The coordinates $b$ and $a$ are each coordinated with one condition of one out of $n$ chains. As mentioned above, $r$ out of $n$ chains may also be used, which, by a decoding operation, lead to the one out of $$\binom{n}{r}\text{-chains}$$

of this embodiment.

The chain $C_4a$ assures that in each case application of the highest priority class of $a$ is processed. The chain $C_3b$ assures that several applications of the same rank are cyclically processed in succession. The $a$ sections in this embodiment correspond to the previously mentioned $x$ sections considered above. The various $y$ values of the applying units are conjunctively fed to the grid points or AND-gates of such a plane. With a constant condition present at $a$, that is, when considering processes during which the chain $C_4a$ has no reason to transfer to a higher class, the rule is that $b$ is cyclically switched on and thus all applying units are considered with the same priority rank. However, if at any state $b$ whatsoever the class is raised according to the requirements of the system, this system cannot remember the location or call of which of the units has been last answered. Chain $C_3b$ is again switched on cyclically in accordance with the requirements of the new class. If the return to the old or lower class takes place, the first value of $b$ is a random occurrence concerning the old class. Beginning with this value $b$, the chain $C_3b$ is again switched on cyclically. The use of the $b$ registration after each class transfer will thus always start anew with a random $b$ value.

With infrequent class transfers, the irregularity with which the processing of the units of the same rank begins does not have any noticeable effect. The reason for this is that it may be assumed that in this event there is sufficient time available between two successive class transfers for processing a complete $b$ cycle. It may also be assumed that in general all units are processed with the same probability. However, with more frequent class transfers, the disturbing effect may become intolerable, and special measures may have to be taken. In this case, a one out of $n$ chain for $b$ is coordinated with each class $a$, or at least in each case with a few classes jointly. The "one" in such a chain remains when the system transfers out of this class, and it cyclically continues its migration from there when the system releases this class for further processing.

After the unit has processed the order, it transmits an all-clear or OK signal to the applying unit which still stands in waiting position at $y_{m(ab)}$. This signal is again supplied by means of an intermediate element for equalizing the cycle. The effect of this is that the "one" continues, in the applicant unit, from $y_{m(ab)}$ its prescribed path to the $y$ chain.

Figure 6:
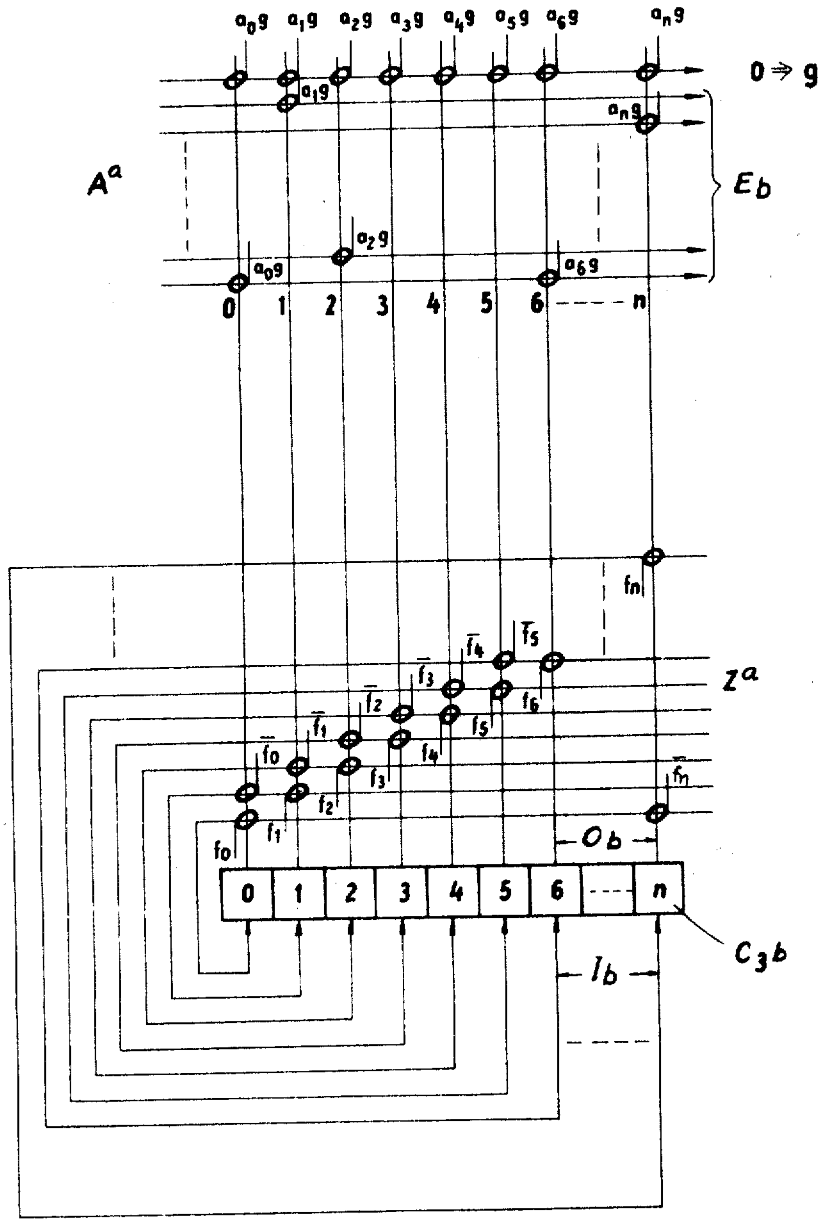
FIGURE 6 is a matrix diagram similar to FIGURE 1 which is provided for the device of FIGURE 5, again in conjunction with priority type of operation.

It is a fundamental condition for a switching operation that the unit $m$ selected is not just then busy processing an order. For this condition, a readiness flip-flop has jurisdiction and feeds its content to all AND-gates of the cube. An intersecting plane $a$ corresponds to the special conditions in a definite class (FIGURE 6). The applications $p_b$ of a definite class $a$, for example, all magnetic tape apparatus of the same rank, are introduced as conditions for the "waiting" or "switching on" of the "one" in the chain $C_3b$ in the $Z^a$ matrix of the plane.

A further condition is also the state of the previously mentioned readiness flip-flop $g$. An operation is finally triggered in the operations control arranged behind or past it, if both an application $p_b=1$ is available, and the release $g=1$ has been reported from the side of the operations control. Then a switching operation of outputs $E_b$ of the functional part $A^a$ is to take place, as symbolized by the legends in the functional part $A^a$. At the same time, $g$ must be again cancelled for otherwise there is the possibility that a further switching operation will be triggered immediately thereafter.

The maintaining of the "one" in the chain $C_3b$ in the state $b$ will be assured if an application $p_b$ is on hand, but there has not yet been a release $g$. These conditions $p_b \cdot \bar{g}$ are designated by $f_b$. On the other hand, the "one" is to be switched on if no application $\bar{p}_b$ is on hand, or if an application $p_b$ is present at the same time with a release $g$. It is thus:

$$\bar{p}_b V p_b \cdot g \rightarrow \bar{f}_b$$

The two conditions for waiting $f_b$ and for switching on $\bar{f}_b$ are complementary and accordingly are designated by one variable and recorded with the legends in the $Z^a$ section. According to this and considering the explanation previously given, the mode of operation within the plane of FIGURE 6 should be clear.

Because of the simple cyclic mode of processing the applications by the chain $C_3b$, the structure of the section of the $Z^a$ matrix pertinent for the continuous switching of this chain is very simple. Devices which effect the continuous switching of the "one" in the chain $C_4a$ are designed accordingly.

It will be understood that the above description of the present invention is susceptible to various modifications, changes and adaptations, and the same are intended to be comprehended within the meaning and range of equivalents of the appended claims.

What is claimed is:

1. A control unit for computers and the like for determining the sequence of operations, comprising, in combination: a sequence chain of binary elements each having an output, at least one of said elements being able to assume a condition which differs from that of the other elements thereby to activate its output; and a matrix in which the active outputs of said elements become effective, said matrix including AND-gates having first and second inputs, one of said inputs being the output of said elements for introducing conditions, said matrix further including a first operational section having outputs for determining the different operations, and a second operational section having return connections to said sequence chain for determining the sequence in which said chain elements are actuated, the sequence being independent of the outputs of said first operational section.

2. A control unit as defined in claim 1, comprising a plurality of such matrices with the chain elements becoming effective in a switching sequence in each matrix.

3. A control units as defined in claim 2, comprising a further sequence chain for controlling the switching sequence.

4. A control unit as defined in claim 3, wherein said further sequence chain is controlled by said matrices and has active outputs which become conjunctively effective in the matrices.

5. A control unit as defined in claim 4, wherein said matrices are controlled by at least one sequence chain and are arranged so that the outputs of one matrix become conjunctively effective in another matrix.

6. A control unit as defined in claim 2, comprising a counter, at least one of the matrices connected with the active outputs of the chain elements having a third operational section with outputs connected to the binary stages of said counter for counting repetitions of activation of the chain elements.

7. A control unit as defined in claim 6, comprising AND-gates for controlling said chain elements, said second operational section having outputs for exciting and for deenergizing the chain elements, each of said outputs being connected as the first inputs to said AND-gates, the output of said repetition counter being connected as the second inputs to said AND-gates.

8. A control unit as defined in claim 1, comprising at least one further sequence chain, matrix AND-gates connected thereto for controlling operation of other operating units, the outputs of said first operational section being connected to said further sequence chain so that the operations controlled by said first operational section may be successively coordinated with other operating units for priority controlled operation or simultaneous operation.

9. A control unit as defined in claim 8, wherein two such further sequence chains are provided and coordinated with a plurality of further matrices and arranged so that one of the matrix controlled sequence chains operates cyclically and is arranged successively to assign other operating units of the same rank to the outputs of the matrices, while another of the matrix controlled sequence chains assigns the units to the outputs of the matrices according to classes of rank.

10. A control unit as defined in claim 9, wherein several cyclically controlled sequence chains are coordinated with one class of rank.

11. A control unit as defined in claim 2, comprising a readiness flip-flop assembly for providing operational state signals and arranged to become conjunctively effective in said matrices.

12. In electronic calculating machines, office machines, and the like, a control device for determining a sequence of operations and comprising a matrix and a sequence chain composed of binary elements each having an effective output, at least one element being caused to assume an excited condition which differs from that of the other elements to activate its effective output, wherein the outputs of the chain elements become effective in said matrix, said matrix containing (A) conjunctive logical connections for the processing of (1) conditions and (2) any decodings, as well as (B) disjunctive logical connections, and including (a) a first functional component which, through its outputs, determines the different operations and (b) a second functional component which, via connections leading back to the chain itself, determines the sequence in which the chain elements are excited.

References Cited by the Examiner

UNITED STATES PATENTS

| | | | |
|---|---|---|---|
| 2,872,110 | 2/1959 | Snyder et al. | 235—61 |
| 2,901,603 | 8/1959 | Weil et al. | 235—92 |
| 3,042,305 | 7/1962 | Edwards et al. | 235—157 |
| 3,119,011 | 1/1964 | Franck et al. | 235—92 |

ROBERT C. BAILEY, *Primary Examiner.*

WALTER W. BURNS, Jr., *Examiner.*

B. D. REIN, R. M. RICKERT, *Assistant Examiners.*